(12) United States Patent
Holbein et al.

(10) Patent No.: US 10,518,743 B2
(45) Date of Patent: Dec. 31, 2019

(54) COUPLING FOR A BELT TIGHTENER

(71) Applicant: TRW AUTOMOTIVE GMBH, Alfdorf (DE)

(72) Inventors: Wolfgang Holbein, Alfdorf (DE); Bernd Greiner, Plüderhausen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 321 days.

(21) Appl. No.: 15/318,759

(22) PCT Filed: Jun. 17, 2015

(86) PCT No.: PCT/EP2015/001224
§ 371 (c)(1),
(2) Date: Dec. 14, 2016

(87) PCT Pub. No.: WO2015/197174
PCT Pub. Date: Dec. 30, 2015

(65) Prior Publication Data
US 2017/0136987 A1 May 18, 2017

(30) Foreign Application Priority Data

Jun. 24, 2014 (DE) .................. 10 2014 009 038

(51) Int. Cl.
*B60R 22/46* (2006.01)
*F16D 41/12* (2006.01)

(52) U.S. Cl.
CPC .............. *B60R 22/46* (2013.01); *F16D 41/12* (2013.01); *B60R 2022/468* (2013.01); *B60R 2022/469* (2013.01); *B60R 2022/4695* (2013.01)

(58) Field of Classification Search
CPC ............ B60R 22/46; B60R 2022/4695; B60R 2022/468; B60R 2022/469; F16D 41/12
See application file for complete search history.

(56) References Cited

U.S. PATENT DOCUMENTS

| 2001/0032902 | A1* | 10/2001 | Specht | ................ B60R 22/4676 242/374 |
| 2005/0098672 | A1* | 5/2005 | Tanaka | .................... B60R 22/28 242/390.8 |
| 2005/0178870 | A1* | 8/2005 | Loffler | .................. B60R 22/405 242/374 |
| 2009/0309345 | A1* | 12/2009 | Specht | .................... B60R 22/46 280/801.1 |
| 2014/0318915 | A1* | 10/2014 | Nuding | .................. B60R 22/46 192/45.1 |

FOREIGN PATENT DOCUMENTS

DE 102011119343 A1 * 5/2013 ............. B60R 22/46

* cited by examiner

*Primary Examiner* — Jacob S. Scott
(74) *Attorney, Agent, or Firm* — Tarolli, Sundheim, Covell & Tummino LLP

(57) ABSTRACT

In a coupling (18) for a belt tensioner (10) in a vehicle comprising an input element (26), an output element (34), a coupling element (28) which is movably supported between an initial position and an activated position and in the activated position couples the input element (26) to the output element (34), and a control element (36) which upon movement of the input element (26) relative to the control element (36) moves the coupling element (28) between the initial position and the activated position, the control element (36) is coupled to an inertia mass (36).

15 Claims, 3 Drawing Sheets

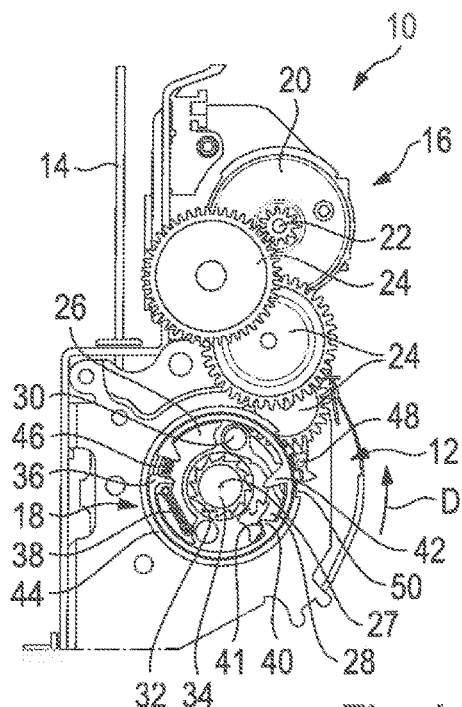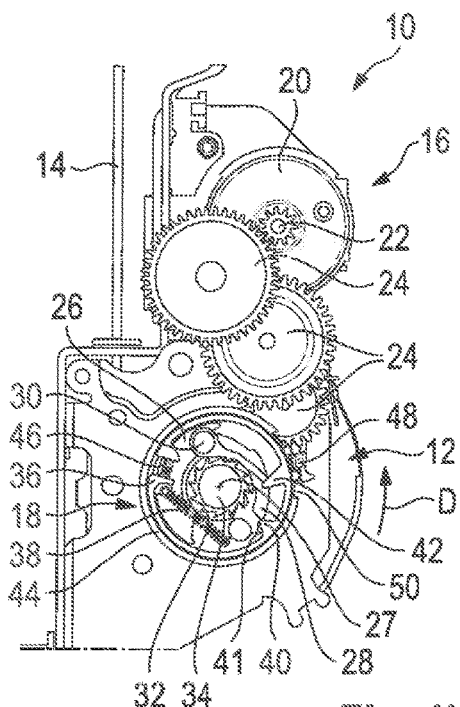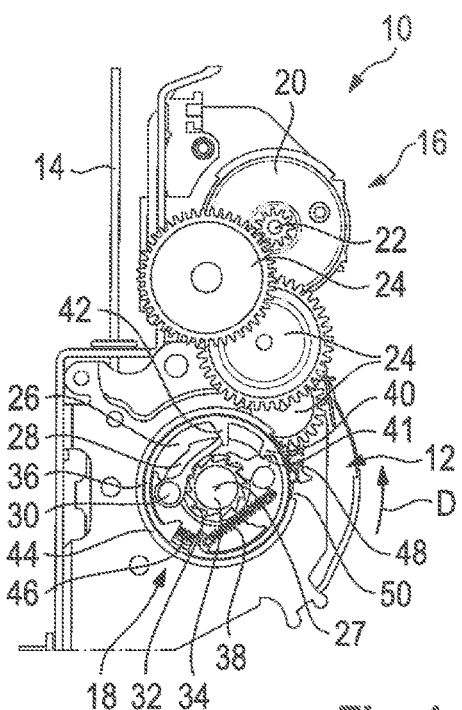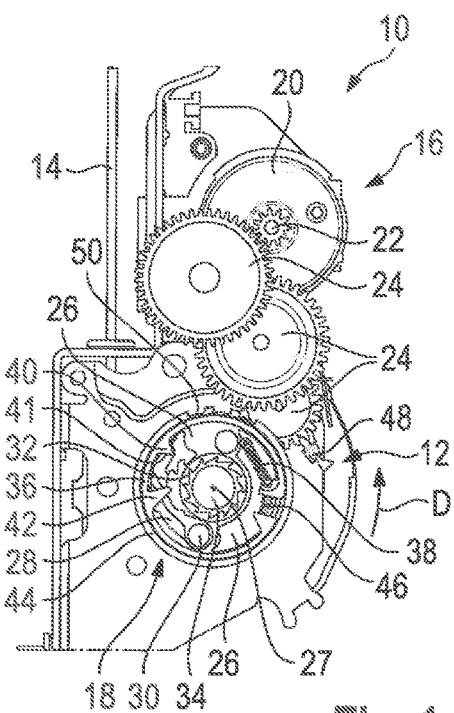

COUPLING FOR A BELT TIGHTENER

RELATED APPLICATIONS

Figure 2:
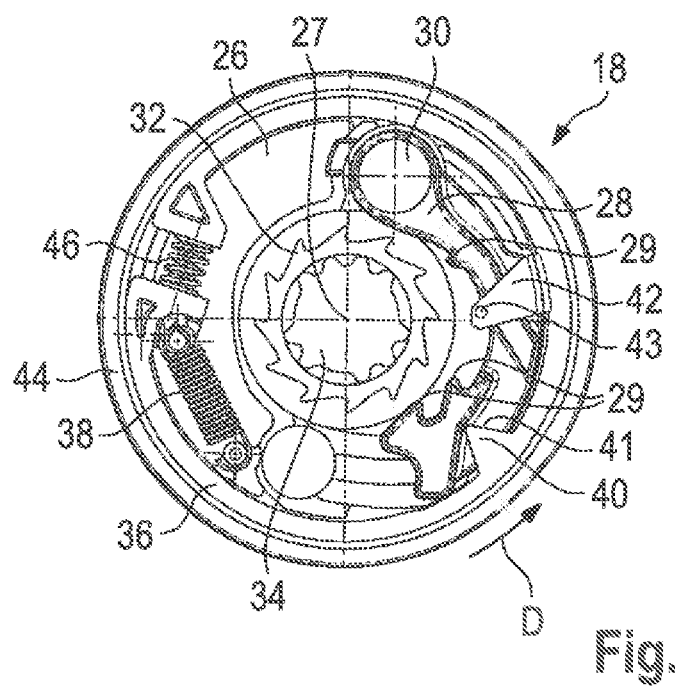

This application corresponds to PCT/EP2015/001224, filed Jun. 17, 2015, which claims the benefit of German Application No. 10 2014 009 038.8, filed Jun. 24, 2014, the subject matter of which are incorporated herein by reference in their entirety.

BACKGROUND OF THE INVENTION

The invention relates to a coupling for a belt tensioner in a vehicle comprising an input element, an output element, a coupling element which is movably supported on the input element between an initial position and an activated position and in the activated position couples the input element to the output element, and a control element which upon movement of the input element relative to the output element moves the coupling element between the initial position and the activated position.

Reversible belt tensioners include a drive adapted to be coupled to the retracting axle of a belt reel by means of a coupling. In regular operation of the belt retractor the belt reel is uncoupled from said drive so that unhindered winding and unwinding of the webbing onto and, resp., from the belt reel is possible, in the case of tensioning the drive is coupled to the belt reel via the coupling so that the webbing can be wound onto the belt reel and thus can be withdrawn.

A coupling for such belt tensioner is illustrated in DE 10 2011 119 343 A1, for example. The coupling substantially consists of an input element in the form of a disk which is permanently coupled to the drive, an output element coupled to the belt reel and a coupling element adapted to couple the input element to the output element. Further, there are provided a control element for moving the coupling element upon movement of the input element relative to the output element into an activated position in which the input element and the output element are coupled as well as a control lever adapted to fix the control element in a stationary manner.

In the case of tensioning the input element is moved and thus rotated by the drive. The control lever engages in the control element, for example a control disk, and maintains the same fixed so that the driven input element is displaced along with the coupling element relative to the control element. In this way, the coupling element is moved into the activated position in which the input element and the output element are coupled.

In order to uncouple the input element from the output element, it is required to control the drive so that it rotates into the opposite direction and, by moving the control element toward the input element, the coupling element is moved back to the initial position again.

This requires a drive that is adapted to rotate the input element into two opposite directions as well as a control which is controlled by the direction of rotation of the drive and of the input element.

SUMMARY OF THE INVENTION

It is the object of the invention to provide a coupling for a belt tensioner in a vehicle which allows for a simpler control.

For achieving the invention it is provided in a coupling of the type described in the beginning to couple the coupling element to inertia mass.

The previously known couplings have a relatively low weight so that for a movement of the input element relative to the control element an additional blocking means, for example a control lever, is required for restraining the control element when the input element is driven. The blocking means remains engaged during uncoupling. In order to move the input element to a position relative to the control element in which the input element is uncoupled from the output element, in addition the input element has to be actively moved, for example rotated, into an opposite direction.

Since, according to the invention, the control element is coupled to inertia mass, it cannot follow a rapid movement of the input element due to the large mass and lags behind the input element. Thus with a rapid movement of the input element the control element automatically lags behind and thus the coupling element moves from the initial position into the activated position without any additional element such as a control element being required.

Since the control element is not blocked by a lever, the control element may return, upon completion of the tensioning operation or upon diminishing acceleration of the input element by the drive, for example when being spring-loaded, into the original position relative to the input element, which causes the coupling element to return to the initial position. Hence no opposite rotation of the input element by the drive is required. The drive as well as the control for the drive may be designed in a by far simpler way, as merely rotation into one direction of rotation is necessary.

The input element and the control element may be disk-shaped or ring-shaped, for example, and may be rotatably supported about a joint axis. This enables a simple and compact design of the coupling and thus of the belt tensioner.

Preferably the input element and the control element are coupled to each other via a spring element the spring element being biased in the activated position of the coupling element. After completion of the tensioning operation and, resp., the decrease of a drive force by deactivating the drive, said spring element causes the control element to be returned relative to the input element to an original position in which the coupling element may be returned to the initial position. The spring element in addition ensures that only in the case of high acceleration during which the inertia mass lags behind the input element the coupling is activated. In the case of slow movement of the drive or slow rotation of the belt reel the control element co-moves with the input element due to the spring tension so that the coupling is not activated. By selecting the spring hardness the response behavior of the coupling may be influenced. In the case of a hard spring very high acceleration is necessary, while in the case of a soft spring lower acceleration is sufficient.

The inertia mass may be designed to be ring-shaped and may enclose the control element in the circumferential direction. Thus the inertia mass has an as high mass inertia moment as possible, thus causing the inertia mass to have a small mass.

The control element may be coupled to the inertia mass in different ways. Preferably the control element is pressed, especially by spring load, against the inertia mass, in this way high friction is present between the control element and the inertia mass. The friction is selected so that upon acceleration of the input element the control element is coupled to the inertia mass so that the control element is not displaced against the inertia mass. When higher force acts on the control element or the inertia mass, when for example the inertia element is blocked by an additional control lever, the control element may still be displaced against the inertia mass.

The control element is formed, for example, by a discontinuous ring which is forced apart by spring load and the inside of which is thus pressed against the inertia mass. In this way the control element is pressed uniformly against the entire inner periphery of the inertia mass, thus causing high friction to act between the inertia mess and the control element.

The coupling element may be a coupling pawl, for example, engaging in a toothing on the output element in the activated position. The coupling pawl may be designed, for instance, so that when force is applied to the input element the coupling pawl is not released so that the coupling pawl is maintained in the activated position in addition to the control element.

The coupling pawl may be moved, for example, from radially outside against the toothing of the output element into the activated position, wherein preferably tensile load is applied to the coupling pawl in this way permanent coupling of the input element to the output element is ensured via the tensioning operation, i.e. when the tensioning force is maintained.

In order to enable the input element to be coupled to the output element even during a slow motion of the input element, at the control element and/or at the inertia mass there may additionally be provided a toothing into which a control lever may engage so as to maintain the inertia mass and/or the control element fixed so that when the input element is driven a movement takes place relative to the control element.

BRIEF DESCRIPTION OF THE INVENTION

Figure 3:
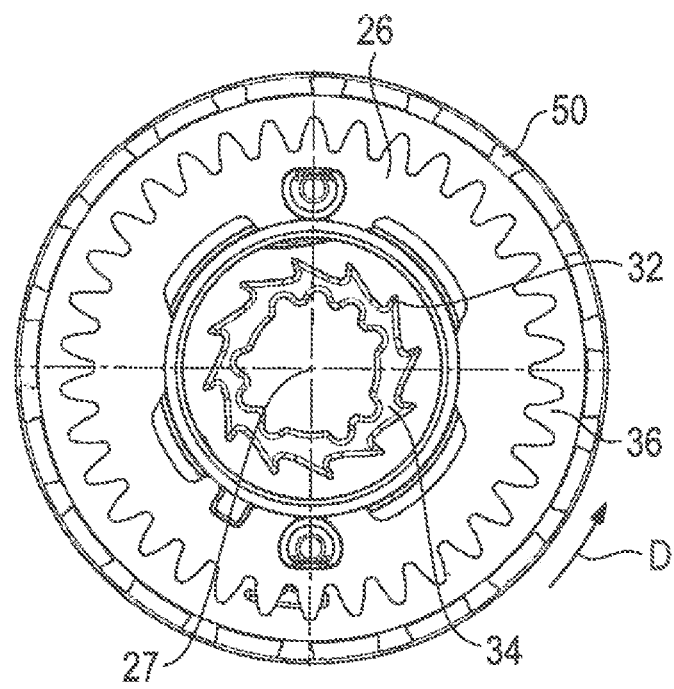
Figure 4:
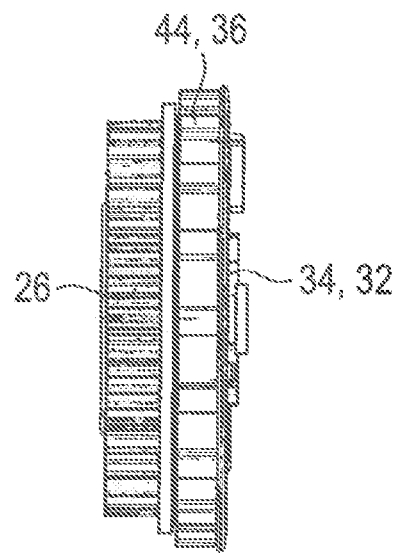
Figure 5:
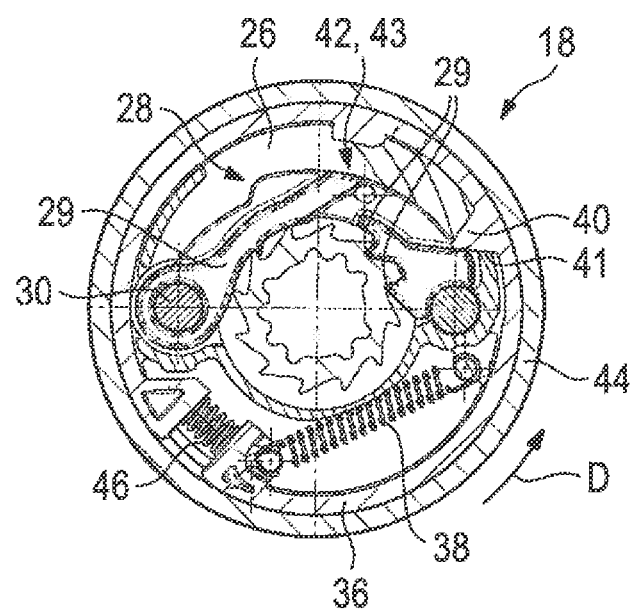

Further advantages and features will be evident from the following description in combination with the enclosed drawings, in which;

FIGS. 1a to 1d show a belt tensioner comprising a coupling according to the invention during tensioning, FIG. 2 shows a detailed view of the coupling of FIG. 1, FIG. 3 shows a view from the lower side of the coupling of FIG. 2 in the area of the input element and of the control element, FIG. 4 shows a side view of the coupling of FIG. 2, and FIG. 5 shows a section of the coupling of FIG. 2 with the coupling element being in an activated position.

DESCRIPTION

In FIGS. 1a to 1d a belt tensioner 10 for a belt reel 12 is shown. On the belt reel 12 webbing 14 of a seat belt of a vehicle may be wound in a direction of rotation D. In a case of restraint, tensioning of the webbing 14 may be initiated by the belt tensioner 10 in that a drive 16 is coupled to the belt reel 12 via a coupling 18, thus causing the belt reel 12 to be loaded in the direction of rotation D.

The drive 16 includes a drive motor 20 having a motor gearwheel 22 coupled to a spur gear unit 24. The spur gear unit 24 is coupled to an input element 26 of the coupling 18. The input element 26 is formed by a disk (cf, also FIGS. 3 and 4) which is rotatable about the axis 27 of the belt reel 12. At the outer periphery of the input element 26 a toothing into which the spur gear unit 24 engages is provided.

Moreover, at the input element 26 a coupling element 28, a coupling lever in the embodiment shown here, is provided which is movable from an initial position shown in FIG. 1a to a activated position shown in FIG. 1b. The coupling element 26 is pivoting about a pivot 30 on the input element 28.

As is evident especially from FIG. 2, the coupling element 28 is arc-shaped and extends over an angle of approx. 140° in the circumferential direction about the axis 27. At the coupling element 28 plural teeth 29 spaced in the circumferential direction are provided which may engage in a toothing 32 of an output element 34, as will be explained hereinafter.

In the activated position the coupling element 28 is engaged in the toothing 32 of the output element 34 which is coupled to the belt shaft of the belt reel 12 and is rotatable about the axis 27 thereof. When the coupling element 28 is provided in the activated position, the coupling element 28 engages in the toothing 32 and couples the output element 34 to the input element 26. In this way the output element 34 and thus the belt reel 12 can be moved by the drive 16 in the direction of rotation D and the webbing 14 can be wound onto the belt reel 12 (FIGS. 1b to 1d).

The teeth 29 include an undercut so that the teeth 29 can be released from the toothing 32 only in the case of an opposite rotation of the output element 34. Hence in the activated position the coupling element 28 is reliably coupled to the output element. The coupling element 28 can be released only when there is no force acting on the input element and the output element.

For moving the coupling element 28 from the initial position to the activated position there is provided a control element 36 formed by a discontinuous ring which is supported rotatably relative to the input element about the axis 27. The control element 36 is coupled to the input element 26 via a spring element 38, with the spring element 38 being substantially unloaded in the initial position of the coupling element as shown in FIG. 1a.

At the control element 36 an activating geometry 40 is provided which upon movement of the input element 26 and thus also of the coupling element 28 supported on the input element, moves the coupling element 28 relative to the control element to the activated position (FIG. 1b). Furthermore, a deactivating geometry 42 is provided which returns the coupling element 28 to the initial position upon an opposite rotation of the input element 26 relative to the control element 36. The deactivating geometry 42 for this purpose includes a pin 43 which is adjacent to the coupling element 28 and upon rotation against the direction of rotation D moves the latter away from the toothing 32 (FIGS. 2 and 5).

As is evident especially in FIG. 2, the coupling moreover includes an inertia mass 44 formed by a ring which encloses the control element 36 in the circumferential direction. The inertia mass 44 is coupled to the control element 36. Said coupling is established by forcing the control element 36 apart by a spring 46 arranged at the interruption of the ring so that the latter on its inside is pressed against the inertia mass 44. Due to the friction resulting, the control element 36 and the inertia mass 44 are frictionally coupled to each other.

When the input element 26 is accelerated by the drive 16 in the direction of rotation D, the large mass causes the inertia mass 44 to lag behind the movement of the input element 26. The control element 36 coupled to the inertia mass 44 equally lags behind the movement of the input element 26 along with the inertia mass 44, wherein the spring element 38 is tensioned (FIG. 1b).

Due to the movement of the input element 26 relative to the control element 36, the coupling element 28 gets into contact with the activating geometry 40. The activating geometry 40 includes an inclined contact surface 41 against which the coupling element 28 abuts. Upon further rotation of the control element 36 in the direction of rotation D, the coupling element is urged radially inwardly by said contact face until the teeth 29 engage in the toothing 32 of the output element 34. In such activated position the input element 26 is coupled to the output element 34. In the case of further rotation of the input element 26, the output element 34 and thus the belt reel 12 are moved in the direction of rotation D, with the webbing 14 being tensioned (FIG. 1c).

As is evident from FIGS. 1b and 1c, at the input element 26 a stop for the coupling element 28 is provided to which the coupling element 28 is adjacent in the activated position so that it cannot be urged further against the output element 34. In this position the activating geometry 40 is adjacent to the coupling element 28, and thus to the input element 26, so that the control element 36 and the inertia mass 44 are rotated along with the input element upon further rotation of the latter. This is additionally assisted by the biased spring element 38 which allows further displacement or twisting of the control element 36 against the input element 26 in the case of increased force only.

Upon completion of the tensioning operation the drive 16 is deactivated so that no force is exerted on the input element 26 and thus on the coupling 18. The spring element 38 moves the control element 36 and hence the inertia mass 44 to the original position vis-à-vis the input element 26, with the coupling element 28 being returned to the initial position by the disengaging geometry 42.

Hence, the input element 26 is uncoupled from the output element 34 automatically after completion of the tensioning operation without any additional control being required. The drive 16 and, resp., the control for the drive 16 thus may be designed in a substantially simpler manner, as the input element 26 need not be rotated into the opposite direction or any pawl for the control element 36 need to be removed so as to move the control element 36 relative to the input element 26. This operation is carried out by the spring element 38 biased during the coupling operation. The output element 34 is moved by the belt winding spring (not shown) in the retracting direction D so that the coupling element 28 may be released from the undercut. Reversing the direction of rotation of the drive is not required, nor is any reversal of the direction of rotation or polarity reversal of the motor required.

In addition, for activating the coupling 18 and thus of the belt tensioner 10 no active control and, resp., no additional control lever are required apart from the activation of the drive 16.

As is evident from FIGS. 1a to 1d, nevertheless an additional control lever 48 may be provided for engaging in a toothing 50 on the outside of the inertia mass 44. A slow rotation of the input element 26 would not be sufficient, due to the coupling by the spring element 38, to bring about a movement of the coupling element relative to the input element. When the control lever 48 engages in the toothing 50 of the inertia mass 44, the inertia mass 44 is maintained fixed independently of the velocity or the acceleration of the input element 26. When the control lever is activated, even in the case of slow rotation of the input element 26 the input element 26 and consequently the coupling lever 28 are rotated against the control element 36 and thus are coupled to the output element 34.

In the embodiment shown here the input element 26 and the control element 36 are disk-shaped or ring-shaped and are rotatably supported about a joint axis, in this case the axis 27 of the belt reel 12. This renders the coupling very compact so that it may be employed even in the case of small constructed space. Irrespective thereof, the input element 26 and the control element 36 may have any design, as long as it is ensured that the coupling element 28 is moved to the activated position by a movement of the input element 26 relative to the control element 36.

The inertia mass 44 in this embodiment is equally ring-shaped, thus causing the same to have a very high mass inertia moment. Irrespective thereof, the inertia mass 44 may have any design, as long as the inertia mass 44 is ensured to be sufficiently large so that the control element 36 lags behind the input element 26 when the latter is accelerated. The inertia mass 44 may be adjusted to the desired acceleration at which the coupling 12 is intended to be activated.

The invention claimed is:

1. A coupling (18) for a belt tensioner (10) in a vehicle, comprising an input element (26), an output element (34), a coupling element (28) which is movably supported on the input element (26) between an initial position and an activated position and in the activated position couples the input element (26) to the output element (34), and comprising a control element (36) which upon movement of the input element (26) relative to the control element (36) moves the coupling element (28) between the initial position and the activated position, wherein the control element (36) is coupled to an inertia mass (44), the inertia mass (44) being rotatable with the control element (36).

2. The coupling according to claim 1, wherein the input element (26) and the control element (36) are disk-shaped or ring-shaped and are supported to be rotatable about a joint axis.

3. The coupling according to claim 1, wherein the input element (26) and the control element (36) are coupled to each other via a spring element (38), wherein the spring element (38) is biased in the activated position of the coupling element (28).

4. The coupling according to claim 1, wherein the inertia mass (44) is ring-shaped and encloses the control element (36) in the circumferential direction.

5. The coupling according to claim 1, wherein the control element (36) is pressed against the inertia mass (44) by a spring load.

6. The coupling according to claim 5, wherein the control element (36) is formed by a discontinuous ring which is forced apart by the spring load.

7. The coupling according to claim 1, wherein the coupling element (28) is a coupling pawl which in the activated position engages in a toothing (32) on the output element (34).

8. The coupling according to claim 7, wherein the coupling element (28) is moved from radially outside against the toothing (32) of the output element (34) into the activated position.

9. The coupling according to claim 1, wherein the control element (36) and/or the inertia mass (44) include a toothing for engagement of a control lever (48).

10. The coupling according to claim 1, wherein the coupling element, when in the activated position, transfers torque from the input element to the output element to cause the output element to rotate with the input element.

11. The coupling according to claim 1, wherein the output element is immediately fixed for rotation with the input element upon movement of the coupling element to the activated position.

12. The coupling according to claim 1, wherein the input element and the control element are coupled to each other via a spring element, the spring element being under tension in the activated position of the coupling element.

13. The coupling according to claim 1, wherein a spring load presses the control element radially outward against the inertia mass.

14. The coupling according to claim 1, wherein an outer periphery of the input element is provided with toothing.

15. The coupling according to claim 1, wherein the control element is rotatable relative to the inertia mass.

* * * * *